United States Patent Office 2,868,784
Patented Jan. 13, 1959

2,868,784
PROCESS FOR THE MANUFACTURE OF STEROIDS

Leopold Ruzicka and Oscar Jeger, Zurich, Switzerland, assignors to Ciba Pharmaceutical Products Inc., Summit, N. J., No Drawing. Application October 3, 1955
Serial No. 538,272

Claims priority, application Switzerland October 8, 1954

12 Claims. (Cl. 260—239.57)

This invention relates to a new series of cyclopentanophenanthrene derivatives. More particularly, this invention is concerned with 11:12-unsaturated 13-substituted steroids and methods for their preparation. Also included within the scope of this invention are the 13-unsubstituted tertiary 17a-hydroxy-D-homo-12:18-bisnor-steroids and their esters.

The recently isolated highly active new suprarenal cortex hormone, aldosterone, having the following formulae which obviously represent an equilibrium,

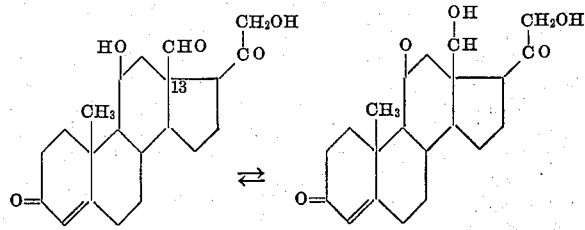

differs from known steroid hormones by the presence of the new substituent in the 13-position. This compound and its preparation is fully described in copending application, Serial No. 444,657, filed on July 20, 1954, by Tadeus Reichstein et al.

Aldosterone has heretofore been obtainable only by extraction from suprarenal glands. As the content of aldosterone in the suprarenal gland is very small it is not possible to obtain in this manner the quantities of aldosterone required for therapeutic purposes. Accordingly, there is a need for a new abundant source for the production of this medicament. However, hitherto no processes have become known for making aldosterone synthetically. Starting, for example, from the starting materials customarily used for making steroid hormones there is the obvious difficulty of replacing the methyl group in the 13-position by an aldehyde group.

The present invention is based on the observation that steroids substituted in the 13-position by any desired organic substituent can be made by subjecting a tertiary 17a-hydroxy-D-homo-12:18-bisnor-steroid unsubstituted in the 13-position, to the action of an agent capable of eliminating water, and if desired converting the substituent in the 13-position of the resulting compound.

The new process may be illustrated by the following scheme of partial formulae:

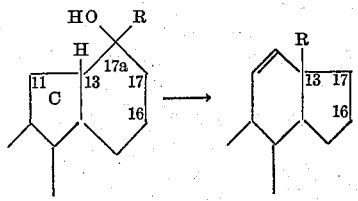

in which R represents an organic substituent, advantageously a free or functionally converted carboxyl group such, for example, as an esterified carboxyl group or more especially the nitrile group, or a substituted or unsubstituted alkyl, alkenyl or alkinyl residue, such as a methyl, oxymethyl, aminomethyl, carbalkoxymethyl, vinyl, acrylic acid or ethinyl residue.

The starting materials defined above may be saturated or unsaturated and of any desired steric configuration. In the 10-position they may contain hydrogen or an unsubstituted or substituted methyl group. Of special practical interest are the compounds having a cis-linkage of the rings A and B, and those which contain a double bond starting from the 5-carbon atom, that is to say, in the 4:5- or 5:6-positions. In other respects they may be substituted in any desired manner, for example, in the 17- or 16- and 17-positions by those side chains which are present in the sterols, such as cholesterol, stigmasterol, ergosterol, the bile acids, such as desoxycholic acid, bisnor-, nor- and aetianic acids, the spirostanes, such as hecogenin, rockogenin, the furostanes and the pregnanes. There are advantageously used compounds having a free or functionally converted hydroxyl or oxo group in the 3-position, such, for example, as esters, ethers, thioesters, thioethers, thiol- or thion-esters, acetals, mercaptals, enol derivatives, such as enol esters, enol ethers or enamines, hydrazones, semicarbazones and the like.

The tertiary 17a-hydroxy-D-homo-12:18-bisnor-steroids unsubstituted in the 13-position used as starting materials are not known. They can be obtained from 17a-oxo-12:18-bisnor-steroids unsubstituted in the 13-position, for example, by additive combination with hydrocyanic acid or by reaction with organo-metal compounds according to the partial formulae

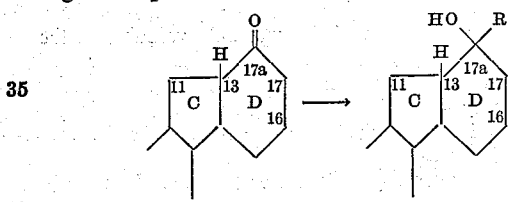

Among the organo-metal compounds there may be mentioned more especially the Grignard compounds, such as methyl magnesium halides, the alkali metal acetylides, for example, from acetylene or ethoxy-acetylene, and also the organo metal compounds of the Reformatzky or Darzens reaction formed e. g. by reacting the ketone with a bromoacetic acid ester in the presence of zinc or sodium hydride, respectively. Before carrying out the additive combination at the 17a-oxo group any other oxo groups present, for example, in the 3-position, are protected in known manner, for example, by ketalization.

Suitable agents capable of eliminating water are the halides of sulfur or phosphorus, above all thionyl chloride and phosphorus oxychloride, in an organic base such as pyridine or piperidine. The elimination of water may also be carried out by means of more or less concentrated organic or inorganic acids or their anhydrides, for example, formic acid, oxalic acid, hydrochloric acid, phosphoric acid, phosphorus pentoxide, or by means of inorganic salts, for example, zinc chloride or potassium bisulfate, advantageously in the presence of a diluent or solvent. The elimination of water may also be carried out indirectly by first esterifying the hydroxyl group in the 17a-position of the starting material, especially with a sulfonic acid such as methane or para-toluene sulfonic acid, and then treating the resulting ester with a base, for example, an alkali or alkaline earth, such as sodium, potassium or calcium hydroxide or alcoholate, for example, potassium tertiary-butylate.

The conversion of the substituent R in the resulting 11:12-unsaturated compounds can be carried out in various ways depending on the starting materials used. An esterified carboxyl group or nitrile group may be hydrolysed by the action of an acid or alkaline agent. In this case lactonization of the free carboxyl group to the 11-carbon atom according to the partial formulae

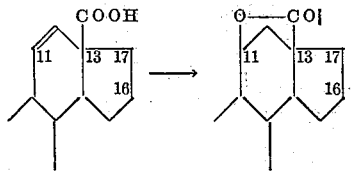

generally takes place at the same time.

Vinyl groups may be degraded by oxidative splitting to aldehyde or carboxyl groups, for example, by direct hydroxylation with osmium tetroxide or by epoxylation with peracids, hydrolysis followed by glycol splitting with lead tetracetate or periodic acid, by ozonisation and splitting off the ozonide or by oxidation with potassium permanganate. An ethinyl group can be converted by selective hydrogenation, especially in the presence of a lead catalyst, into a vinyl group, and the latter can then be degraded in the manner described above, or it may first be converted by hydration, advantageously in the presence of formic acid, into an acetyl group, which can be degraded in known manner to a carboxyl group.

The ultimate products of this invention, namely the 11:12-unsaturated steroid-18-acids and the corresponding 11:12-saturated 11-hydroxy-18:11-lactones are useful as intermediates for the preparation of therapeutically active products. Thus the 18:11-lactone of $3\alpha:11\beta$-dihydroxy-cholanic acid-18-acid may be converted to aldosterone as described in the example hereinafter. The utility of aldosterone is well-known and has been described in numerous scientific publications. It is a genuine corticosteroid and for this reason it is extremely valuable in the treatment of various diseases characterized by adrenal gland insufficiency. For example, aldosterone is effective in maintaining electrolyte balance and well-being in patients with adrenal cortical hypofunction, as in the case of Addison's disease.

The following example illustrates the invention:

*Example*

4.5 grams of $3\alpha$-acetoxy-17a-hydroxy-17a-cyano-D-homo-12:18-bisnor-chlolanic acid methyl ester are dissolved in 40 cc. of pyridine. 1.5 cc. of thionyl chloride are added while cooling with ice, and the mixture is allowed to stand for 12 hours at room temperature. After the addition of ice and water the precipitated reaction product is taken up in ether, and the ethereal extract is washed in succession with dilute hydrochloric acid, dilute sodium carbonate solution and water, and dried and evaporated. By chromatographic purification there is obtained $\Delta^{11}$-$3\alpha$-acetoxy-cholenic acid methyl ester-18-acid nitrile, which exhibits no absorption in ultra-violet light. The test with tetranitromethane is positive.

In order to hydrolyse the nitrile group 1 gram of $\Delta^{11}$-$3\alpha$-acetoxy-cholenic acid methyl ester-18-acid nitrile is heated with 50 cc. of a solution of 10 percent strength of caustic potash in a mixture of water and methanol (1:3) for 5 hours in a closed tube at 150° C. After being cooled, the contents of the tube are rinsed out with water, and the alkaline solution is extracted with ether in order to remove neutral substances. By acidifying the alkaline solution there is obtained $\Delta^{11}$-$3\alpha$-hydroxy-cholenic acid-18-acid, which can be converted into the 18:11-lactone of $3\alpha:11\beta$-dihydroxy-cholanic acid-18-acid by treatment with a mixture of 1 gram of sulfuric acid and 50 cc. of glacial acetic acid overnight, at 20° C.

The $3\alpha$-acetoxy-17a-hydroxy-17a-cyano-D-homo-12:18-bisnor cholanic acid methyl ester used as starting material can be prepared as follows:

5 grams of $3\alpha$-benzoyloxy-12-keto-cholanic acid ethyl ester dissolved in 14 cc. of glacial acetic acid, 60 cc. of methanol and 40 cc. of chloroform, are mixed in the course of 20 minutes at 0° C. with 14.5 grams of potassium cyanide. The reaction mixture is allowed to stand for a further 30 minutes at 5° C. and for one hour at 20° C. After the addition of ether, the ethereal extract is washed with dilute sodium bicarbonate solution and water, dried and evaporated, and there are obtained 4.8 grams of crude $3\alpha$-benzoyloxy-12-hydroxy-12-cyano-cholanic acid methyl ester.

In order to eliminate water 4.5 grams of the above cyanhydrin are dissolved in 40 cc. of pyridine, 1.5 cc. of thionyl chloride are added while cooling, and the mixture is allowed to stand for 12 hours at room temperature. By diluting the reaction mixture with ether and washing the ethereal extract with dilute hydrochloric acid and water, drying it and evaporating the ether, there are obtained 4.3 grams of an oil which is purified by chromatography over a column of 130 grams of aluminum oxide (activity equals ⅔). By means of a mixture of petroleum ether and benzene (3:1) a total of 3.7 grams of $3\alpha$-benzoyloxy-17a-methylene-D-homo-12-nor-cholanic acid methyl ester-18-acid nitrile are elutriated.

The above compound (3.7 grams) is dissolved in 100 cc. of methylene chloride and the solution is ozonised at $-70°$ C. After distilling off the solvent, the ozonide is dissolved in 80 cc. of glacial acetic acid, and, after the addition of 1 gram of zinc, the solution is heated for 1½ hours on the water bath. The reaction solution is washed with a sodium bicarbonate solution and water, dried and evaporated, and there are obtained 3.7 grams of $3\alpha$-benzoyloxy-17a-oxo-12-nor-cholanic acid methyl ester-18-acid nitrile, and for the purpose of ketonic hydrolysis the latter is mixed with 10 grams of potassium hydroxide dissolved in 100 cc. of a mixture of water and methanol (3:1) and heated for 4 hours on the water bath. The crude acid so obtained is esterified with diazo methane, and after-acetylated with a mixture of acetic anhydride and pyridine. There are obtained 2.9 grams of $3\alpha$-acetoxy-17a-oxo-D-homo-12:18-bisnor-cholanic acid methyl ester, which melts at 146–147° C. after recrystallization from methanol.

In order to form the cyanhydrin 220 milligrams of the above ketone are treated with a mixture of 2 cc. of hydrocyanic acid, 1–2 cc. of chloroform and 0.2 cc. of triethylamine overnight at 20° C. After the addition of ether, the ethereal solution is washed with dilute sodium carbonate solution and water, dried and evaporated, and there is obtained $3\alpha$-acetoxy-17a-hydroxy-17a-cyano-D-homo-12:18-bisnor-cholanic acid methyl ester, which melts at 144–146° C. with decomposition after recrystallization from methanol.

The 18:11-lactone of $3\alpha,11\beta$-dihydroxy-cholanic acid-18-acid may be converted to aldosterone for example in the following manner:

By reaction with phenylmagnesium bromide a tertiary 24:24-diphenyl-carbinol is formed, from which water may be split off yielding the 18:11-lactone of $\Delta^{23:24}$-$3\alpha:11\beta$-dihydroxy-24:24-diphenyl-cholene-18-acid. This compound may be degraded by allylic bromination at carbon atom 22 with the aid of N-bromo succinimide, splitting off hydrobromic acid with the formation of the 18:11-lactone of $\Delta^{22:22;23:24}$-$3\alpha:11\beta$-dihydroxy-24:24-diphenyl-choladiene-18-acid, and oxidation of the diene-system with chromic acid to form the 18:11-lactone of the $3\alpha:11\beta$-dihydroxy-20-keto-pregnane-18-acid. The keto group in position 20 is then ketalized with ethylene glycol in the presence of an acid catalyst, the $3\alpha$-hydroxyl group oxidized with chromic acid pyridine complex, then a bromine atom is introduced in 4-position by means of bromine and hydrobromic acid, the ketal grouping in the 20-position being simultaneously split up. By splitting off hydrogen bromide from the compound thus formed with semi-carbazide and pyruvic acid a double bond is introduced in 4:5-position, then the 3-keto group is converted into the ethylenedioxy-group with the aid of methyl ethyl dioxolane and thus there is obtained the 18:11-lactone of Δ⁵-3-ethylenedioxy-11β-hydroxy-20-keto-pregnene-18-acid. This compound can be converted to aldosterone in the following manner: treatment with oxalic acid dimethyl ester in the presence of an alkaline condensing agent affords the (18→11β)-lactone of Δ⁵-3-ethylenedioxy-11β-hydroxy-20-keto-pregnene-18-acid-21-oxalo-acid methyl ester, which in the form of its sodium enol salt is treated with halogen, e. g. iodine, whereby the corresponding 21-halogenated oxalo acid ester is obtained. By acid cleavage of this compound, the (18→11β)-lactone of Δ⁵-3-ethylenedioxy-11β-hydroxy-20-keto-21-halogen-pregnene-18-acid is obtained. By treatment with an aqueous acid this compound is converted to the (18→11β)-lactone of the Δ⁵-3-ethylenedioxy-11β:21-dihydroxy-20-keto-pregnene-18-acid. The 20-keto group of this compound is then protected by conversion into the ethylenedioxy ketal group in the manner described above for the 3-ketal group. The (18→11β)-lactone of Δ⁵-3:20-bis-ethylenedioxy-11β:21-dihydroxy-pregnene-18-acid is then reduced in tetrahydrofurane solution with an amount of lithium aluminum hydride calculated for the reduction of the lactone to the semi-acetal group while taking into account the 21-hydroxyl group. The Δ⁵-3:20-bis-ethylenedioxy-11β:21-dihydroxy-18-oxo-pregnene thus obtained is hydrolyzed with 50% acetic acid. From the crude product which results, aldosterone can be obtained by chromatography.

What is claimed is:

1. A compound selected from the group consisting of those having the general formula

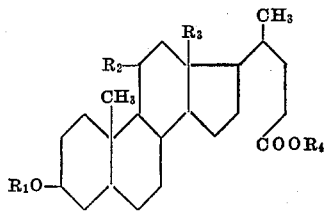

wherein $R_1$ is a member selected from the group consisting of a lower alkyl carbonyl radical and hydrogen, $R_2$ is a member selected from the group consisting of a hydrogen atom and a hydroxyl group, $R_3$ a member selected from the group consisting of a nitrile group, a free carboxyl group, an esterified and a lactonized carboxyl group and $R_4$ is a member selected from the group consisting of hydrogen and a lower alkyl group with the proviso that when $R_2$ is hydrogen the 11:12-position is unsaturated.

2. A compound of the formula

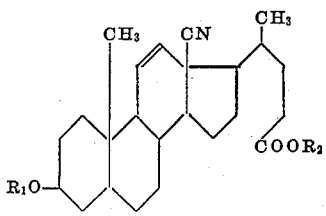

in which $R_1$ is a member selected from the group consisting of hydrogen and a lower alkyl carbonyl radical and $R_2$ is a member selected from the group consisting of hydrogen and a lower alkyl radical.

3. A compound of the formula

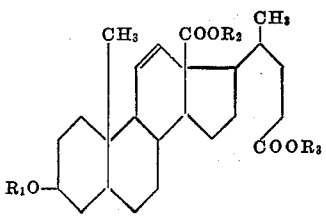

in which $R_1$ is a member selected from the group consisting of hydrogen and a lower alkyl carbonyl radical and $R_2$ and $R_3$ are members selected from the group consisting of hydrogen and a lower alkyl radical.

4. The compound of the formula

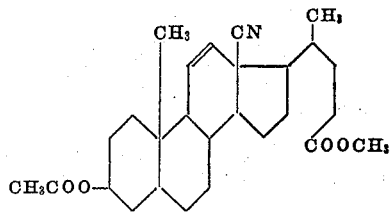

5. The compound of the formula

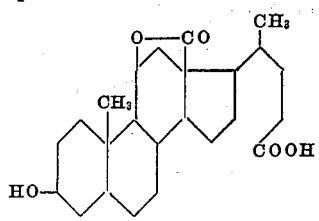

6. The compound of the formula

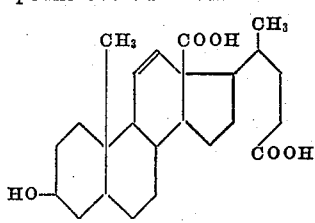

7. The process which comprises the step of treating a compound of the general formula

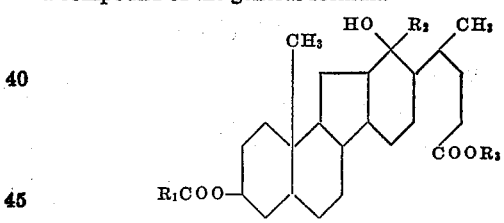

wherein $R_1$ and $R_3$ are lower alkyl radicals, $R_2$ is a member selected from the group consisting of a nitrile group and an esterified carboxyl group, with a dehydrating agent selected from the group consisting of a sulphur and a phosphorus halide in an organic base to produce a compound of the formula

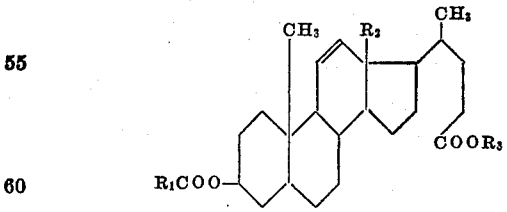

wherein $R_1$, $R_2$ and $R_3$ have the meanings given above.

8. The process which comprises the step of treating a compound of the formula

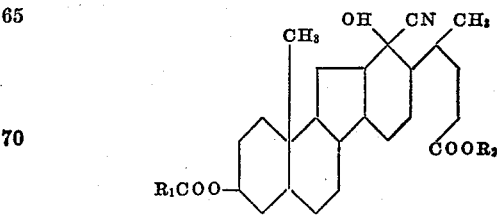

wherein $R_1$ and $R_2$ are lower alkyl groups with a dehydrating agent selected from the group consisting of a sulphur and a phosphorus halide in an organic base to produce the compound of the formula

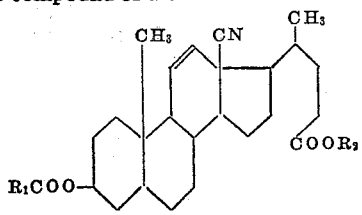

wherein $R_1$ and $R_2$ have the meaning given above, and hydrolyzing such compound with an alkaline hydrolyzing agent.

9. The process which comprises the step of treating a compound of the general formula

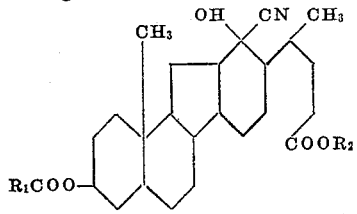

wherein $R_1$ and $R_2$ are lower alkyl groups with a dehydrating agent selected from the group consisting of a sulphur and a phosphorus halide in an organic base, hydrolyzing the compound thus obtained with an alkaline hydrolyzing agent and treating the hydrolyzed compound with a mixture of acetic acid and sulphuric acid to produce the compound of the formula

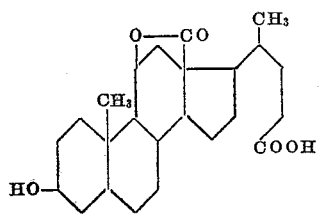

10. A process which comprises the step of treating 3α-acetoxy-17α-hydroxy-17α-cyano-D-homo - 12:18 - bisnorcholanic acid methyl ester with thionyl chloride in pyridine and hydrolyzing the compound thus obtained with an alkaline hydrolyzing agent.

11. A compound of the formula

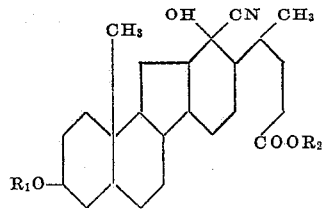

wherein $R_1$ is a member selected from the group consisting of a lower alkyl carbonyl group, a benzoyl group and a hydrogen atom, and $R_2$ is a member selected from the group consisting of a hydrogen atom and a lower alkyl group.

12. The compound of the formula

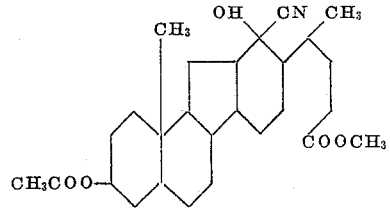

References Cited in the file of this patent

Experientia, vol. XI, Fasc IX, September 15, 1955, pages 365–68.

Helv. Chimica Acta, vol. 37, pages 1200–1223.

UNITED STATES PATENT OFFICE

Certificate of Correction

Patent No. 2,868,784

January 13, 1959

Leopold Ruzicka et al.

It is hereby certified that error appears in the printed specification of the above numbered patent requiring correction and that the said Letters Patent should read as corrected below.

Column 3, line 5, right-hand formula, the vertical line appearing to the right of "CO" should be canceled; column 4, line 62, for "$\Delta^{22:22;23:24}$" read $-\Delta^{20:22;23:24}-$ Signed and sealed this 7th day of July 1959.

[SEAL]

Attest:
KARL H. AXLINE,
Attesting Officer.

ROBERT C. WATSON,
Commissioner of Patents.